United States Patent
Totsuka

(10) Patent No.: US 9,332,202 B2
(45) Date of Patent: May 3, 2016

(54) SOLID-STATE IMAGING APPARATUS AND IMAGING SYSTEM

(71) Applicant: CANON KABUSHIKI KAISHA, Tokyo (JP)

(72) Inventor: Hirofumi Totsuka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/625,077

(22) Filed: Feb. 18, 2015

(65) Prior Publication Data
US 2015/0244963 A1 Aug. 27, 2015

(30) Foreign Application Priority Data
Feb. 25, 2014 (JP) .................................. 2014-033927

(51) Int. Cl.
*H04N 5/335* (2011.01)
*H04N 5/3745* (2011.01)
*H04N 5/378* (2011.01)
*H04N 5/357* (2011.01)
*H04N 5/217* (2011.01)

(52) U.S. Cl.
CPC ........... *H04N 5/37455* (2013.01); *H04N 5/357* (2013.01); *H04N 5/3575* (2013.01); *H04N 5/378* (2013.01); *H04N 5/37452* (2013.01)

(58) Field of Classification Search
CPC .............. H04N 5/374; H04N 5/37452; H04N 5/37455; H04N 5/376; H04N 5/378; H04N 5/357; H04N 5/3575
USPC ................. 348/241, 294, 308–310; 250/208.1
See application file for complete search history.

(56) References Cited

U.S. PATENT DOCUMENTS

| | | | | |
|---|---|---|---|---|
| 6,518,910 B2 * | 2/2003 | Sakuragi | ............. | H03M 1/1225 341/118 |
| 7,633,540 B2 | 12/2009 | Totsuka | | |
| 7,990,440 B2 | 8/2011 | Kobayashi et al. | | |
| 8,084,729 B2 | 12/2011 | Kato et al. | | |
| 8,154,639 B2 * | 4/2012 | Kato | .................... | H04N 5/3575 250/208.1 |

(Continued)

FOREIGN PATENT DOCUMENTS

| JP | 2013055447 A | 3/2013 |
|---|---|---|
| JP | 2013093837 A | 5/2013 |

OTHER PUBLICATIONS

U.S. Appl. No. 14/612,572, filed Feb. 3, 2015.

(Continued)

*Primary Examiner* — Ngoc-Yen Vu
(74) *Attorney, Agent, or Firm* — Fitzpatrick, Cella, Harper & Scinto

(57) ABSTRACT

A solid-state imaging apparatus, wherein an analog to digital conversion unit converts an analog signal from the pixel, a first memory holds the digital signal from the analog to digital conversion unit, and thereafter, a second memory holds the digital signal held by the first memory. The analog to digital conversion unit converts an analog signal from the pixel based on a photoelectric conversion of the pixel, and the first memory holds the digital signal from the analog to digital conversion unit. The first memory includes a first latch circuit holding a digital signal from the analog to digital conversion unit and a second latch circuit holding a signal held by the first latch circuit. The second memory includes a third latch circuit holding a signal held in the first latch circuit and a fourth latch circuit holding a signal held in the third latch circuit.

11 Claims, 6 Drawing Sheets

(56) References Cited

U.S. PATENT DOCUMENTS

| | | |
|---|---|---|
| 8,189,081 B2 | 5/2012 | Totsuka |
| 8,411,185 B2 | 4/2013 | Totsuka |
| 8,456,554 B2 * | 6/2013 | Takahashi ............... H03M 1/14 250/208.1 |
| 8,553,118 B2 | 10/2013 | Saito et al. |
| 8,605,182 B2 | 12/2013 | Totsuka et al. |
| 8,665,354 B2 | 3/2014 | Okura |
| 8,848,079 B2 | 9/2014 | Itano |
| 8,937,672 B2 | 1/2015 | Totsuka et al. |
| 8,981,987 B2 * | 3/2015 | Hashimoto ............ H04N 5/378 341/155 |
| 2011/0080625 A1 | 4/2011 | Totsuka |
| 2014/0168491 A1 | 6/2014 | Totsuka |

OTHER PUBLICATIONS

U.S. Appl. No. 14/640,526, filed Mar. 6, 2016.
U.S. Appl. No. 14/662,604, filed Mar. 19, 2015.
U.S. Appl. No. 14/665,137, filed Mar. 23, 2015

* cited by examiner

SOLID-STATE IMAGING APPARATUS AND IMAGING SYSTEM

BACKGROUND OF THE INVENTION

1. Field of the Invention

The present invention relates to a solid-state imaging apparatus and an imaging system.

2. Description of the Related Art

In recent years, CMOS image sensors are being widely used in digital cameras, digital camcorders, and camera units for mobile telephones. In response to demands to reduce the number of components and the power consumption, CMOS image sensors that have a built-in analog to digital (AD) conversion unit have been developed. One form of such kind of CMOS image sensor is referred to as a "ramp-type column ADC". In a ramp-type column ADC, an AD conversion unit (ADC) is provided for each column of a pixel array. The ramp-type column ADC includes a comparator circuit and a reference signal generation circuit that are provided for each column. In many cases, the comparator circuit compares a pixel signal and a ramp signal that serves as a reference signal, measures a time period until the magnitude relationship between the potential of the pixel signal and the potential of the ramp signal inverts, and holds the measured time period as digital data in a column memory that is provided for each column. For example, Japanese Patent Application Laid-Open No. 2013-93837 discloses a method that outputs a count signal to respective column circuits by using a reference signal and a single counter that is referred to as a so-called "common counter" that counts a time period from a time point that the voltage of the reference signal starts to change from an initial voltage.

However, in the configuration disclosed in Japanese Patent Application Laid-Open No. 2013-93837, an N memory that holds a result obtained by performing AD conversion of a signal corresponding to resetting of a pixel, and an S memory that holds a result obtained by performing AD conversion of a signal corresponding to incident light from a pixel are physically separate circuits. Consequently, propagation delays until a count signal and a comparison result signal reach the N memory and the S memory, respectively, cannot be made completely equal. Furthermore, because the N memory and the S memory are separate circuits, differences can arise in latch circuit timings due to variations among transistor elements between the N memory and the S memory. That is, count values held in the N memory and the S memory differ due to the above described two factors. Consequently, signal components after CDS (correlated double sampling) processing include offsets and do not become 0. Because the offsets have a specific variation for each column, there is a possibility that the offsets will become noise components that deteriorate the image quality.

An object of the present invention is to provide a solid-state imaging apparatus and an imaging system that can reduce offsets that are noise components.

SUMMARY OF THE INVENTION

According to an aspect of the present invention, a solid-state imaging apparatus comprises: a pixel; an analog to digital conversion unit configured to convert an analog signal outputted from the pixel into a digital signal; a first memory; and a second memory, wherein, during a first conversion period, the analog to digital conversion unit converts, to the digital signal, the analog signal outputted from the pixel in response to a reset of the pixel, the first memory holds the digital signal outputted from the analog to digital conversion unit, thereafter, according to the first transfer control signal, the second memory holds the digital signal held by the first memory, during a second conversion period, the analog to digital conversion unit converts, to the digital signal, the analog signal outputted from the pixel based on a photoelectric conversion of the pixel, the first memory holds the digital signal outputted from the analog to digital conversion unit, and wherein the first memory has a first latch circuit configured to hold the digital signal outputted from the analog to digital conversion unit, and a second latch circuit configured to hold the digital signal held by the first latch circuit, according to a second transfer control signal, and the second memory has a third latch circuit configured to hold the digital signal held in the first latch circuit, according to the first transfer control signal, and a fourth latch circuit configured to hold the digital signal held by the third latch circuit, according to a third transfer control signal.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Exemplary Embodiment

Figure 1:
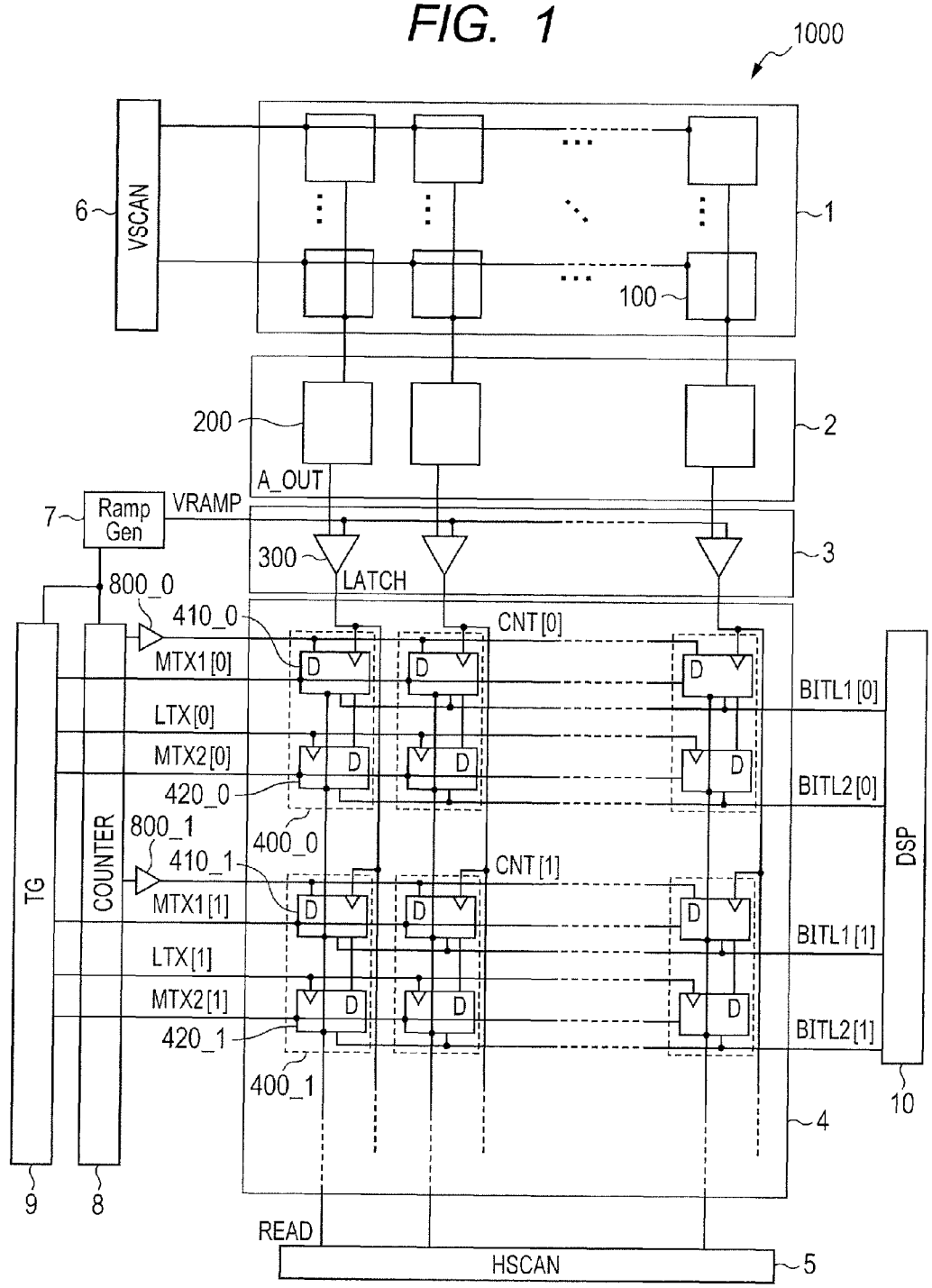
FIG. 1 is a view illustrating a configuration example of a solid-state imaging apparatus according to a first exemplary embodiment of the present invention.

FIG. 1 is a view illustrating a configuration example of a solid-state imaging apparatus 1000 according to a first exemplary embodiment of the present invention. A pixel unit 1 includes a plurality of pixels 100 that are arranged in a two-dimensional matrix shape. Each pixel 100 outputs an analog pixel signal based on incident light by photoelectric conversion. The pixels 100 that are arranged in the matrix shape are sequentially selected by row by a vertical scanning circuit 6. The pixels 100 of the respective columns in the selected row output a pixel signal to a read-out circuit 200 of the respective columns. A read-out circuit unit 2 has a plurality of read-out circuits 200 that are arranged for the respective columns of the pixels 100. The read-out circuits 200 of the respective columns read out and hold pixel signals that are output from the pixels 100 of the respective rows. The respective read-out circuits 200 may have an amplifier that amplifies the signals that are output from the pixels 100, and may have a current source that drives an internal circuit of the respective pixels 100. Hereunder, an example is described in which the readout circuits 200 have an amplifier. A reference signal generation circuit 7 generates a reference signal (ramp signal) VRAMP for which the potential changes at a constant gradient per unit time. Note that, the reference signal VRAMP is not limited to a ramp signal, and may be a signal that changes in a step shape or a signal whose level changes with time. A comparator unit 3 includes a plurality of comparator circuits 300 that are arranged for each column of the pixels 100. The comparator circuit 300 of each column makes a comparison with respect to a magnitude relationship between the reference signal VRAMP that is output from the reference signal generation circuit 7 and an output signal A_OUT of the readout circuit 200 of each column. When the magnitude relationship inverts, the relevant comparator circuit 300 outputs a comparison result signal LATCH. A counter 8 counts count values of N (where N is a natural number) bits in accordance with the AD conversion resolution, and outputs count signals CNT[0] to CNT[N−1] through output buffers 800_0 to 800_N−1. By providing the output buffers 800_0 to 800_N−1 for the count signals CNT[0] to CNT[N−1] of the respective bits, the count signals CNT[0] to CNT[N−1] can be output to first memories 410_0 to 410_N−1 of all the columns. Further, a memory unit 4 may be divided into a plurality of blocks in the horizontal direction, and the count signals CNT[0] to CNT[N−1] may be output to the first memories 410_0 to 410_N−1 of all the columns while relaying the count signals CNT[0] to CNT[N−1] using repeat buffers for the respective blocks. A timing generator 9 outputs transfer control signals MTX1[0] to MTX1[N−1], transfer control signals MTX2[0] to MTX2[N−1] and transfer control signals LTX[0] to LTX[N−1].

The memory unit 4 includes a plurality of memory blocks 400_0, 400_1 arranged for each column of the pixels 100. N memory blocks 400_0 to 400_N−1 that are memory blocks of the same number as the N number of bits that are in accordance with the AD conversion resolution are provided in each column. The memory blocks 400_0 to 400_N−1 are described in detail later referring to FIG. 2. S memory block 400_0 for a count signal CNT[0] of the least significant bit (LSB) and a memory block 400_1 for a count signal CNT[1] of a bit that is one bit higher than the least significant bit (LSB) among all the N bits are illustrated in in FIG. 1. The memory blocks 400_0 to 400_N−1 each include first memories 410_0 to 410_N−1 and second memories 420_0 to 420_N−1. The comparison result signal LATCH and transfer control signals MTX1[0] to MTX1[N−1] are input into each of the first memories 410_0 to 410_N−1, and the first memories 410_0 to 410_N−1 hold count signals CNT[0] to CNT[N−1], respectively. The first memories 410_0 to 410_N−1 output the digital signals that are held to the second memories 420_0 to 420_N−1. Transfer control signals MTX2[0] to MTX2[N−1] and transfer control signals LTX[0] to LTX[N−1] are input into each of the second memories 420_0 to 420_N−1, and the second memories 420_0 to 420_N−1 hold the digital signals that are output from the first memories 410_0 to 410_N−1. In accordance with a read out control signal READ from a horizontal scanning circuit 5, the first memories 410_0 to 410_N−1 output the digital signals held therein to a signal processing unit (DSP) 10 through first output signal lines BITL1[0] to BITL1[N−1]. In accordance with the read out control signal READ from the horizontal scanning circuit 5, the second memories 420_0 to 420_N−1 output the digital signals held therein to the signal processing unit (DSP) 10 through second output signal lines BITL2[0] to BITL2[N−1]. The signal processing unit 10 processes the digital signals that are output from the memory unit 4.

Figure 2:
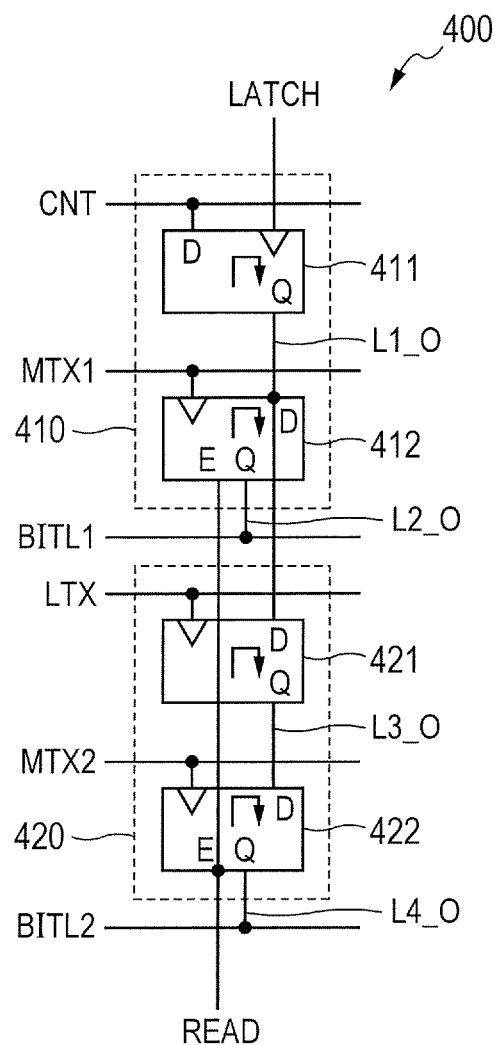
FIG. 2 is a view illustrating a configuration example of a memory block according to the first exemplary embodiment.

FIG. 2 is a view illustrating a configuration example of the memory block 400. The memory block 400 corresponds to the memory blocks 400_0 to 400_N−1 in FIG. 1. A first memory 410 corresponds to the first memories 410_0 to 410_N−1 in FIG. 1, and includes a first latch circuit 411 and a second latch circuit 412. In accordance with the comparison result signal LATCH, the first latch circuit 411 holds a count signal CNT as a digital signal L1_O. The count signal CNT corresponds to the count signals CNT[0] to CNT[N−1] in FIG. 1. The digital signal L1_O is output to the second latch circuit 412 and a second memory 420. The second memory 420 corresponds to the second memories 420_0 to 420_N−1 in FIG. 1. In accordance with the second transfer control signal MTX1, the second latch circuit 412 holds the digital signal L1_O that is being held in the first latch circuit 411, as a digital signal L2_O. Further, in accordance with the read out control signal READ that is output to each column from the horizontal scanning circuit 5, the second latch circuit 412 outputs the digital signal L2_O to a first output signal lines BITL1. A transfer control signal MTX1 corresponds to the transfer control signals MTX1[0] to MTX1[N−1] in FIG. 1. The output signal line BITL1 corresponds to the output signal lines BITL1[0] to BITL1[N−1] in FIG. 1. When an output terminal of the first output signal line BITL1 of the second latch circuit 412 is not selected by the read out control signal READ, the output terminal enters a high impedance state. That is, the second latch circuit 412 is capable of outputting three values that indicate a high level state, a low level state and a high impedance state, respectively, to the first output signal lines BITL1 according to the read out control signal READ.

The second memory 420 corresponds to the second memories 420_0 to 420[N−1] in FIG. 1, and includes a third latch circuit 421 and a fourth latch circuit 422. In accordance with a first transfer control signal LTX, the third latch circuit 421 holds the digital signal L1_O that is being held in the first latch circuit 411, as a digital signal L3_O. The transfer control signal LTX corresponds to the transfer control signals LTX[0] to LTX[N−1] in FIG. 1. The digital signal L3_O is output to the fourth latch circuit 422. In accordance with a third transfer control signal MTX2, the fourth latch circuit 422 holds the digital signal L3_O that is being held in the third latch circuit 421, as a digital signal L4_O. Further, in accordance with the read out control signal READ, the fourth latch circuit 422 outputs the digital signal L4_O to a second output signal line BITL2. The output signal line BITL2 corresponds to output signal lines BITL2[0] to BITL2[N−1] in FIG. 1. Furthermore, similarly to the second latch circuit 412, the fourth latch circuit 422 is capable of outputting three values that indicate a high level state, a low level state and a high impedance state, respectively, to the second output signal line BITL2 according to the read out control signal READ. In this case, the second transfer control signal MTX1 and the third transfer control signal MTX2 may be the same signal.

By adopting the configuration shown in FIG. 2, as described later using FIG. 3, it is possible to perform an AD conversion operation and a horizontal transfer operation in parallel. Note that in a case where it is not necessary to perform an AD conversion operation and a horizontal transfer operation in parallel, the second latch circuit 412 and the fourth latch circuit 422 may be omitted. In that case, a configuration may be adopted so as to output digital signals to the first output signal line BITL1 and the second output signal line BITL2 directly from the first latch circuit 411 and the third latch circuit 421.

Figure 3:
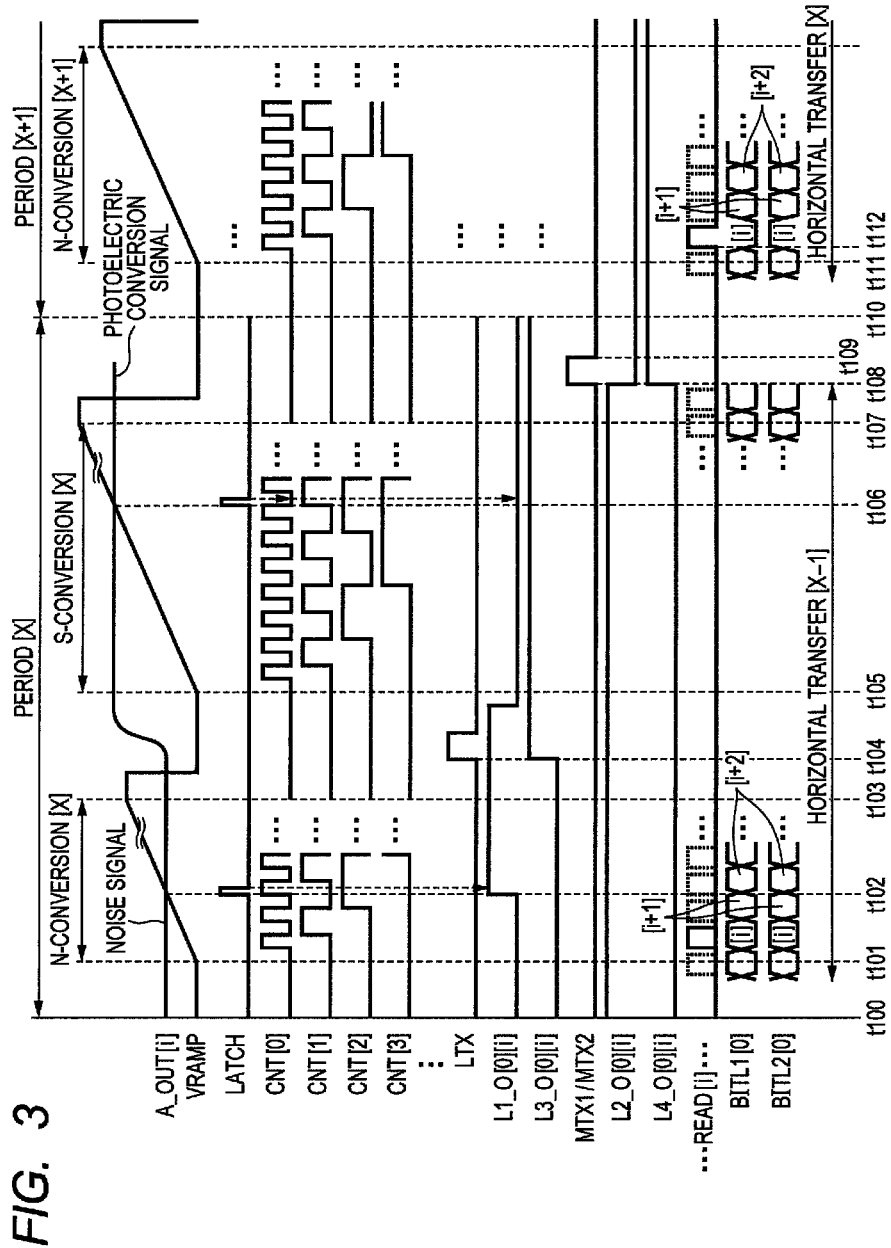
FIG. 3 is a timing chart of the solid-state imaging apparatus according to the first exemplary embodiment.

FIG. 3 is a timing chart that illustrates a method for driving the solid-state imaging apparatus shown in FIG. 1. The timing chart in FIG. 3 focuses on an i column of the pixels 100, and the symbol [i] is added to signal names for signals that are specific to the i column. Further, count signals CNT[0] to CNT[3] of four bits are the signals of the four lower digit bits of the count signals [0] to CNT[N−1] of the N bits, and are taken as count signals CNT[0] to CNT[3] in order from the least significant bit. Only the digital signals L1_O[0], L2_O [0], L3 [0] and L4_O[0] of the least significant bit are shown with respect to the digital signals L1_O, L2_O, L3_O and L4_O that are held by the first to fourth latch circuits 411, 412, 421 and 422 inside the memory block 400. Further, only the output signal lines BITL1[0] and BITL2[0] of the least significant bit are shown with respect to the two output signal lines BITL1 and BITL2. In addition, in FIG. 3, operations for a single period and for part of the subsequent period are shown, and the respective periods are expressed as "period [X]" and "period [X−1]".

At a time t100, the read-out circuit 200 outputs a noise signal as the output signal A_OUT when the pixels 100 and the read-out circuit 200 are in a reset state. The reference signal VRAMP maintains a predetermined initial potential. The count signal CNT is reset to an initial value (for example 0). Further, prior to a time t101, the digital signal L1_O of the first latch circuit 411 is initialized to a predetermined value.

At the time t101, the reference signal generation circuit 7 starts changing the potential of the reference signal VRAMP, and in accompaniment therewith the counter 8 starts the count of the count signal CNT. The potential of the reference signal VRAMP gradually increases.

At a time t102, the magnitude relationship between the reference signal VRAMP and the output signal A_OUT of the read-out circuit 200 inverts, and at that timing the comparator circuit 300 outputs a comparison result signal LATCH that becomes "high" level for a fixed period. At a falling timing of the comparison result signal LATCH, the first latch circuit 411 of the $0^{th}$ bit holds the "high" level that is the value of the count signal CNT[0] as a digital signal L1_O[0][i]. Similarly, the first latch circuits 411 of all bits in the i column hold the count signals CNT[0] to CNT[N−1] as digital signals L1_O[0][i] to L1_O[N−1][i]. The digital signals L1_O[0][i] to L1_O[N−1][i] are digital signals based on noise signals when the pixels 100 and the read-out circuit 200 are in a reset state.

At a time t103, the reference signal generation circuit 7 stops changing the potential of the reference signal VRAMP, and in accompaniment therewith the counter 8 stops the count of the count signal CNT. By this time point, digital signals based on noise signals of all columns including the i column are held in the respective first latch circuits 411. The period from the time t101 to the time t103 is an N-conversion period [X] in the period [X], in which noise signals are subjected to AD conversion from analog signals to digital signals.

At a time t104, the timing generator 9 sets the first transfer control signal LTX to "high" level for a fixed period. Thereupon, the third latch circuit 421 in the second memory 420 holds the digital signal L1_O[0][i] as a digital signal L3_O [0][i]. The noise signals of all bits of all the columns are held in the respective third latch circuits 421. Although at such time the data transfer operations are performed all at the same time by inputting the first transfer control signal LTX simultaneously to the third latch circuits 421 for all bits of all the columns, in order to suppress the occurrence of a through-current when transferring data, a configuration may be adopted in which a plurality of columns or bits are grouped together and data transfer operations for the respective groups are performed with a time difference between the respective groups. For example, the plurality of columns or bits may be divided into an appropriate number of groups, such as two groups constituted by even-numbered columns and odd-numbered columns, respectively, or three groups constituted by the higher digit N/3 bits, the middle digit N/3 bits, and the lower digit N/3 bits, among all the N bits, and the data of the respective groups may be transferred with a time difference between the respective groups.

In the period from the time t103 to a time t105, the reference signal generation circuit 7 returns the reference signal VRAMP to the same potential as the initial potential at the time t100, and the counter 8 resets the count signal CNT to the initial value. Further, the read-out circuit 200 outputs a photoelectric conversion signal when the pixels 100 and the read-out circuit 200 are in a non-reset state as the output signal A_OUT. The photoelectric conversion signal is a pixel signal that is based on incident light. Further, the digital signal L1_O that the first latch circuit 411 holds may be initialized to a predetermined value.

At the time t105, the reference signal generation circuit 7 starts changing the potential of the reference signal VRAMP, and in accompaniment therewith the counter 8 starts the count of the count signal CNT.

At a time t106, the magnitude relationship between the reference signal VRAMP and the output signal A_OUT of the read-out circuit 200 inverts, and the comparison result signal LATCH becomes "high" level for a fixed period. At a falling timing of the comparison result signal LATCH, the first latch circuit 411 of the $0^{th}$ bit holds the "low" level that is the value of the count signal CNT[0] as the digital signal L1_O[0][i]. Similarly, the first latch circuits 411 of all bits in the i column hold the count signals CNT[0] to CNT[N−1] as digital signals L1_O[0][i] to L1_O[N−1][i]. The digital signals L1_O[0][i] to L1_O[N−1][i] are digital signals based on photoelectric conversion signals when the pixels 100 and the read-out circuit 200 are in a non-reset state.

At a time t107, the reference signal generation circuit 7 stops changing the potential of the reference signal VRAMP, and in accompaniment therewith the counter 8 stops the count of the count signal CNT. By this time point, the first latch circuits 411 of all columns including the i column hold digital signals based on photoelectric conversion signals of the pixels 100 of all columns. The period from the time t105 to the time t107 is an S-conversion period [X] in the period [X], in which photoelectric conversion signals are subjected to AD conversion from analog signals to digital signals. The first transfer control signal LTX is output at a time point that is after the N-conversion period and before the S-conversion period.

A time t111 is a time at which an N-conversion period [X+1] of a next period [X+1] is started. In the period from the time t107 to t111, the reference signal generation circuit 7 returns the reference signal VRAMP to the same potential as the initial potential at the time t100, and resets the count signal CNT of the counter 8 to the initial value.

In a period from a time t108 to a time t109, the timing generator 9 sets the second transfer control signal MTX1 and the third transfer control signal MTX2 to "high" level for a fixed period. The high-level pulses of the second transfer control signal MTX1 and the third transfer control signal MTX2 are output after the S-conversion period. At a falling timing of the second transfer control signal MTX1 at the time t109, the second latch circuit 412 holds the "low" level of the digital signal L1_O[0][i] that is a photoelectric conversion signal in the period [X], as a digital signal L2_O[0][i]. Similarly, at a falling timing of the third transfer control signal MTX2 at the time t109, the fourth latch circuit 422 holds the "high" level of the digital signal L3_O[0][i] that is a noise signal in the period [X], as a digital signal L4_O[0][i].

Although only the digital signals L1_O[0][i] to L4_O[0][i] of the least significant bit are shown in FIG. 3, at this time point the photoelectric conversion signals of all bits of the respective columns are held by the respective second latch circuits 412, and the noise signals of all bits of the respective columns are held by the respective fourth latch circuits 422.

From the time t109 onwards, the horizontal scanning circuit 5 performs horizontal scanning by outputting the read out control signal READ in sequence to the respective columns. By this means, the second latch circuits 412 of the respective columns sequentially output the digital signal L2_O[0][i] that is a photoelectric conversion signal to the first output signal lines BITL1. Further, the fourth latch circuits 422 of the respective columns sequentially output the digital signal L4_O[0][i] that is a noise signal to the second output signal lines BITL2.

The period from the time t109 onwards in which the respective columns are scanned is a horizontal transfer period [X] in the period [X], and it is necessary for scanning of all columns to be completed before the second transfer control signal MTX1 and the third transfer control signal MTX2 become "high" level in the period [X+1].

For the purpose of performing digital CDS processing, the signal processing unit 10 extracts a signal component of the respective pixels 100 by calculating a difference between the relevant photoelectric conversion signal of the first output signal line BITL1 and the relevant noise signal of the second output signal line BITL2.

Note that although in the present exemplary embodiment a configuration is adopted so that the second transfer control signal MTX1 and the third transfer control signal MTX2 become "high" level at the same timing, the present invention is not limited thereto. That is, the timings at which the second latch circuits 412 and the fourth latch circuits 422 transfer digital signals, respectively, may be staggered by making the second transfer control signal MTX1 and the third transfer control signal MTX2 a "high" level at different timings. By this means, through-currents that arise when transferring digital signals between the first latch circuits 411 and the second latch circuits 412 and between the third latch circuits 421 and the fourth latch circuits 422 can be dispersed. By suppressing the concentrated occurrence of through-currents, it is possible to suppress the occurrence of a power supply voltage drop at the memory unit 4 and prevent a malfunction of the memory unit 4 and also suppress noise that is caused by crosstalk with respect to peripheral circuits.

As described above, the analog to digital conversion unit includes the reference signal generation circuit 7, the counter 8 and the comparator circuit 300, and converts signals A_OUT that were output from the read-out circuit 200 from analog to digital signals. The first memories 410_0 to 410_N−1 hold the digital signals that were output from the analog to digital conversion unit, in accordance with the comparison result signal LATCH. The second memories 420_0 to 420_N−1 hold digital signals that are being held in the first memories 410_0 to 410_N−1, in accordance with the first transfer control signals LTX[0] to LTX[N−1].

First, in the N-conversion period (first conversion period), the analog to digital conversion unit converts output signals A_OUT of the read-out circuit 200 from analog to digital signals in correspondence with resetting of the pixels 100 and the read-out circuit 200. The first memories 410_0 to 410_N−1 hold the digital signals that were output from the analog to digital conversion unit. Thereafter, in accordance with the first transfer control signals LTX[0] to LTX[N−1], the second memories 420_0 to 420_N−1 hold digital signals that are being held in the first memories 410_0 to 410_N−1.

Next, in the S-conversion period (second conversion period), the analog to digital conversion unit converts output signals A_OUT that are based on photoelectric conversion of the pixels 100 when the pixels 100 and the read-out circuit 200 are in a non-reset state from analog to digital signals. The first memories 410_0 to 410_N−1 hold the digital signals that were output from the analog to digital conversion unit.

Note that although an example in which the S-conversion period is provided after the N-conversion period is described above, the N-conversion period may be provided after the S-conversion period. In that case, first, in the S-conversion period (first conversion period), the analog to digital conversion unit converts output signals A_OUT that are based on photoelectric conversion of the pixels 100 when the pixels 100 and the read-out circuit 200 are in a non-reset state from analog to digital signals. The first memories 410_0 to 410_N−1 hold the digital signals that were output from the analog to digital conversion unit. Thereafter, in accordance with the first transfer control signals LTX[0] to LTX[N−1], the second memories 420_0 to 420_N−1 hold digital signals that are being held in the first memories 410_0 to 410_N−1.

Next, in the N-conversion period (second conversion period), the analog to digital conversion unit converts output signals A_OUT of the read-out circuit 200 when the pixels 100 and the read-out circuit 200 are in a reset state from analog to digital signals. The first memories 410_0 to 410_N−1 hold the digital signals that were converted by the analog to digital conversion unit.

According to the present exemplary embodiment, without adding column circuit elements, in both of the N-conversion period and the S-conversion period, the same first memory 410 holds the count signal CNT at a timing at which the comparison result signal LATCH inverts. That is, the noise signal, the count signal CNT of the photoelectric conversion signal, and the comparison result signal LATCH are input to the same first memory 410 through the same path. Therefore, a difference between the timings of the latch circuits that occur in the conventional technology that is caused by variations between transistor elements or signal propagation delays which arise because signal paths are different does not occur. Accordingly, it is possible to reduce offsets that are noise components that deteriorate image quality. Further, by providing the second latch circuit 412 and the fourth latch circuit 422 for reading in the first memory 410 and the second memory 420, respectively, it is possible to simultaneously perform an AD conversion operation and a horizontal transfer operation in parallel.

Second Exemplary Embodiment

Figure 4:
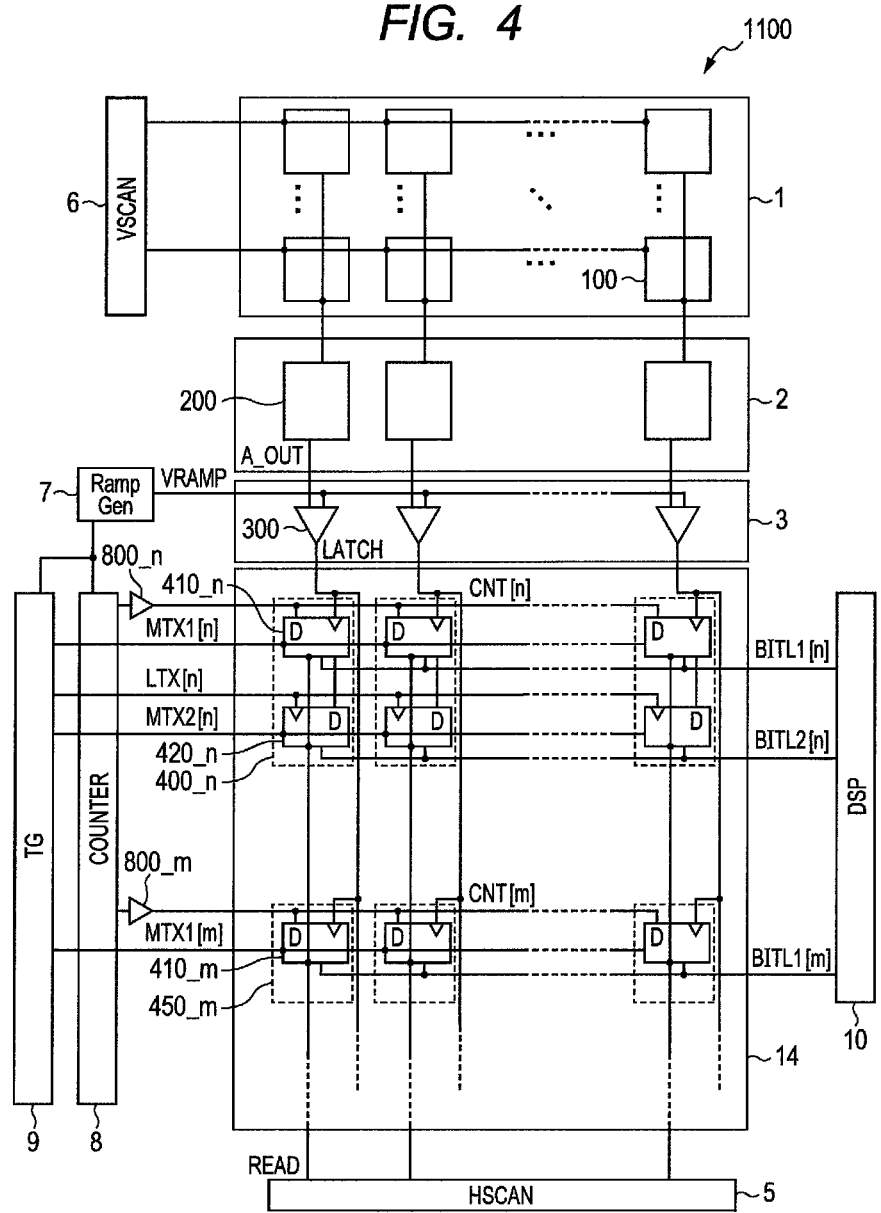
FIG. 4 is a view illustrating a configuration example of a solid-state imaging apparatus according to a second exemplary embodiment of the present invention.

FIG. 4 is a view illustrating a configuration example of a solid-state imaging apparatus 1100 according to a second exemplary embodiment of the present invention. Hereunder, differences between the solid-state imaging apparatus 1100 of the second exemplary embodiment and the solid-state imaging apparatus 1000 of the first exemplary embodiment are described. Components in the present exemplary embodiment that are the same as in the configuration of the first exemplary embodiment are denoted by the same reference symbols, and a description thereof is omitted hereunder. In general, in a ramp-type column ADC, since a signal range of AD conversion (N conversion) of a noise signal is narrow in comparison to a signal range of AD conversion (S conversion) of a photoelectric conversion signal, in many cases a count number in an N-conversion period is also small in comparison to a count number in an S-conversion period. Therefore, in the present exemplary embodiment, a configuration is described in which the solid-state imaging apparatus 1100 has an AD conversion resolution of n bits, and a maximum of $2^N$ is counted in an S-conversion period and a maximum of $2^M$ (N>M, where M is a natural number) is counted in an N-conversion period. A memory unit 14 corresponds to the memory unit 4 in FIG. 1. The memory unit 14 includes M first memory blocks 400_0 to 400_M−1 from a least significant bit [0] to [M−1], and N-M second memory blocks 450_M to 450_N−1 from [M] to an [N−1] bit. In FIG. 4, the memory block 400_0 of the least significant bit and the second memory block 450_M of the M−1$^{th}$ bit are illustrated. The configuration of the first memory blocks 400_0 to 400_M−1 is the same as in FIG. 1, and each of the first memory blocks 400_0 to 400_M−1 includes first memories 410_0 to 410_M−1 and second memories 420_0 to 420_M−1.

Figure 5:
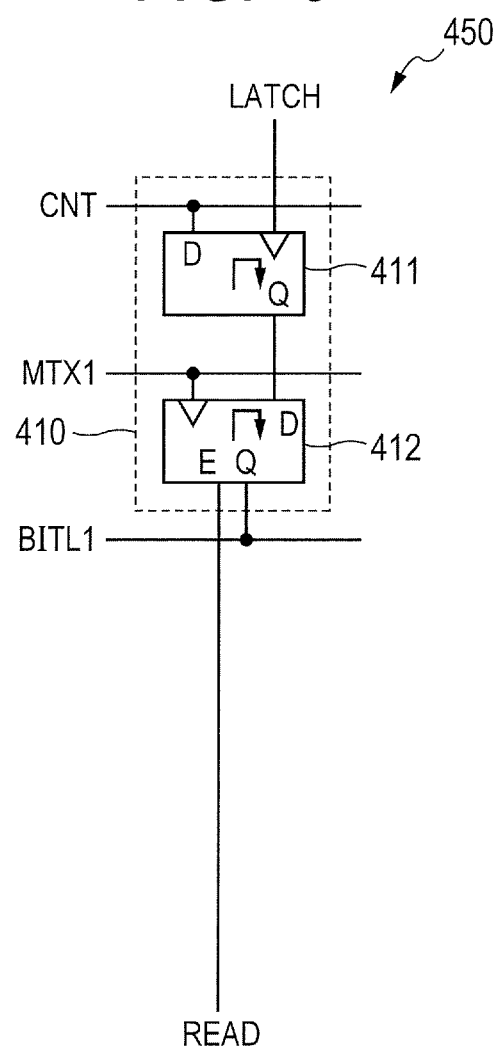
FIG. 5 is a view illustrating a configuration example of a second memory block according to the second exemplary embodiment.

FIG. 5 is a view illustrating a configuration example of a second memory block 450. The second memory block 450 corresponds to the second memory blocks 450_M to 450_N−1 in FIG. 4. Relative to the first memory block 400, the second memory block 450 includes only the first memory 410 and does not include the second memory 420. Similarly to the first exemplary embodiment, the first memory 410 includes the first latch circuit 411 and the second latch circuit 412. Since the second memory block 450 does not include a memory for transferring a digital signal that is held in the N-conversion period, a digital signal that was held in the N-conversion period is overwritten with another digital signal in the S-conversion period. In FIG. 4, the number of first memory blocks 400_0 to 400_M−1 that can hold digital signals of the N-conversion period is M memory blocks, and a maximum count value of $2^M$ can be held during the N-conversion period. Accordingly, a problem does not arise at the second memory blocks 450_M to 450_N−1 even if digital signals that were held in the N-conversion period are transferred in the S-conversion period.

The N first memories 410_0 to 410_N−1 hold the count signals CNT[0] to CNT[N−1] of N bits. The M second memories 420_0 to 420_M−1 hold digital signals of M bits that are part of the lower digit bits among the digital signals of all bits held in the N first memories 410_0 to 410_N−1.

By simplifying the N-M second memory blocks 450_M to 450_N−1 of higher digit bits that are counted in only the S-conversion period, in addition to obtaining the advantageous effects of the first exemplary embodiment, according to the present exemplary embodiment it is also possible to reduce the number of column circuit elements in comparison to the first exemplary embodiment.

Third Exemplary Embodiment

Figure 6:
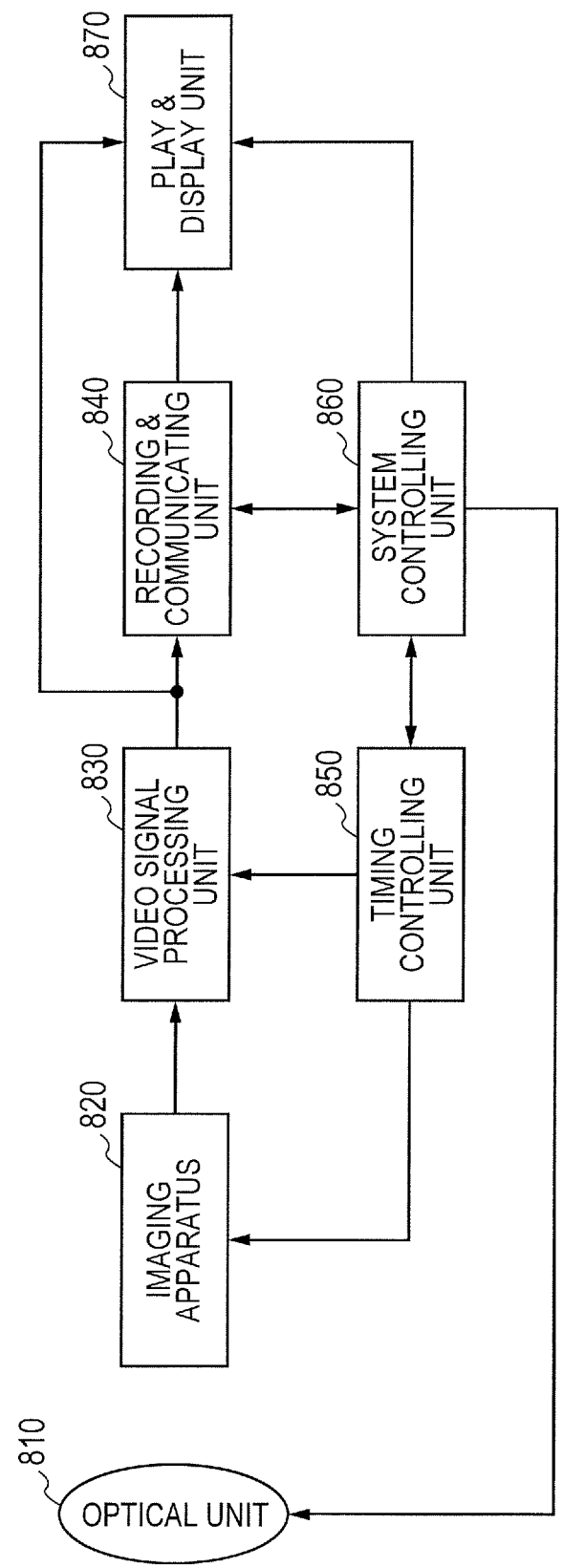
FIG. 6 is a view illustrating a configuration example of an imaging system according to a third exemplary embodiment of the present invention.

FIG. 6 is a view illustrating a configuration example of an imaging system 800 according to a third exemplary embodiment of the present invention. The imaging system 800 includes, for example, an optical unit 810, a solid-state imaging apparatus 820, a video signal processing unit 830, a recording and communicating unit 840, a timing controlling unit 850, a system controlling unit 860, and a play and display unit 870. The solid-state imaging apparatus 1000 or 1100 described in the foregoing exemplary embodiments is used as the solid-state imaging apparatus 820.

The optical unit 810 that is an optical system such as a lens causes light from a subject to be imaged on the pixel unit 1 in which the plurality of pixels 100 are two-dimensionally arrayed of the solid-state imaging apparatus 820 to thereby form an image of the subject. At a timing that is based on a signal from the timing controlling unit 850, the solid-state imaging apparatus 820 outputs signals that are in accordance with the light that was imaged on the pixel unit 1. The signals that are output from the solid-state imaging apparatus 820 are input to the video signal processing unit 830. The video signal processing unit 830 subjects the signals to signal processing in accordance with a method prescribed by a program or the like. Signals obtained as a result of the processing by the video signal processing unit 830 are sent as image data to the recording and communicating unit 840. The recording and communicating unit 840 outputs signals for forming an image to the play and display unit 870 to cause the play and display unit 870 to play and display a moving image or a still image. Further, upon receiving the signals from the video signal processing unit 830, the recording and communicating unit 840 also carries out communication with the system controlling unit 860, and furthermore performs an operation to cause the signals for forming images to be recorded on an unshown recording medium.

The system controlling unit 860 carries out unified control of the operations of the imaging system 800, and controls driving of the optical unit 810, the timing controlling unit 850, the recording and communicating unit 840 and the play and display unit 870. The system controlling unit 860 includes an unshown storage apparatus that is, for example, a recording medium. Programs that are necessary for controlling operations of the imaging system 800 and the like are recorded on the recording medium. The system controlling unit 860 also supplies signals for switching a drive mode in accordance with, for example, a user operation, into the imaging system 800. Specific examples of such signals include a signal for changing a row to be read out or a row to be reset, a signal for changing an angle of view accompanying electronic zooming, and a signal for shifting the angle of view accompanying electronic vibration control. The timing controlling unit 850 controls the drive timing of the solid-state imaging apparatus 820 and the video signal processing unit 830 based on the control by the system controlling unit 860.

It is to be understood that the respective exemplary embodiments described above are intended to illustrate specific examples for implementing the present invention, and are not intended to limit the technical scope of the present invention. That is, the present invention can be implemented in various forms without departing from the technical concept or the principal features thereof.

During both the first conversion period and the second conversion period, since the same first memory holds digital signals that were output from the analog to digital conversion unit, offsets that are noise components can be reduced without adding column circuit elements.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-033927, filed Feb. 25, 2014, which is hereby incorporated by reference herein in its entirety.

What is claimed is:

1. A solid-state imaging apparatus comprising:
a pixel;
an analog to digital conversion unit configured to convert an analog signal outputted from the pixel into a digital signal;
a first memory; and
a second memory, wherein,
during a first conversion period, the analog to digital conversion unit converts, to the digital signal, the analog signal outputted from the pixel in response to a reset of the pixel, the first memory holds the digital signal outputted from the analog to digital conversion unit, thereafter, according to a first transfer control signal, the second memory holds the digital signal held by the first memory,
during a second conversion period, the analog to digital conversion unit converts, to the digital signal, the analog signal outputted from the pixel based on a photoelectric conversion of the pixel, the first memory holds the digital signal outputted from the analog to digital conversion unit, and wherein
the first memory has
a first latch circuit configured to hold the digital signal outputted from the analog to digital conversion unit, and
a second latch circuit configured to hold the digital signal held by the first latch circuit, according to a second transfer control signal, and
the second memory has
a third latch circuit configured to hold the digital signal held in the first latch circuit, according to the first transfer control signal, and
a fourth latch circuit configured to hold the digital signal held by the third latch circuit, according to a third transfer control signal.

2. The solid-state imaging apparatus according to claim 1, wherein
the analog to digital conversion unit has
a counter configured to output a count signal by counting a count value, and
a comparator circuit configured to compare the signal outputted from the pixel with a reference signal of which level changes as time elapses, to outputs a comparison result signal, and
the first memory holds the count signal according to the comparison result signal.

3. The solid-state imaging apparatus according to claim 1, wherein
the second latch circuit outputs the digital signal held therein to a first output signal line according to a read out control signal, and
the fourth latch circuit outputs the digital signal held therein to a second output signal line according to the read out control signal.

4. The solid-state imaging apparatus according to claim 3, wherein
the second latch circuit is capable of outputting three values indicating respectively a high level state, a low level state and a high impedance state to the first output signal line according to the read out control signal, and
the fourth latch circuit is capable of outputting three values indicating respectively a high level state, a low level state and a high impedance state to the second output signal line according to the read out control signal.

5. The solid-state imaging apparatus according to claim 1, wherein
the second and third transfer control signals are outputted after the second conversion period.

6. The solid-state imaging apparatus according to claim 1, wherein
the second and third transfer control signals are the same one signal.

7. The solid-state imaging apparatus according to claim 1, wherein
the first memory outputs the digital signal held therein to a first output signal line according to a read out control signal, and
the second memory outputs the digital signal held therein to a second output signal line according to the read out control signal.

8. The solid-state imaging apparatus according to claim 1, wherein
the second memory holds a bit of a part of lower digit bits in the digital signal of all bits held in the first memory, according to the first transfer control signal.

9. The solid-state imaging apparatus according to claim 1, wherein
the first transfer control signal is outputted after the first conversion period and before the second conversion period.

10. A solid-state imaging apparatus comprising:
a pixel;
an analog to digital conversion unit configured to convert an analog signal outputted from the pixel into a digital signal;
a first memory; and
a second memory, wherein,
during a first conversion period, the analog to digital conversion unit converts, to the digital signal, the analog signal outputted from the pixel based on a photoelectric conversion of the pixel, the first memory holds the digital signal outputted from the analog to digital conversion unit, thereafter, according to a first transfer control signal, the second memory holds the digital signal held by the first memory,
during a second conversion period, the analog to digital conversion unit converts, to the digital signal, the analog signal outputted from the pixel in response to a reset of the pixel, the first memory holds the digital signal outputted from the analog to digital conversion unit, and wherein the first memory has
a first latch circuit configured to hold the digital signal outputted from the analog to digital conversion unit, and
a second latch circuit configured to hold the digital signal held by the first latch circuit, according to a second transfer control signal, and the second memory has
a third latch circuit configured to hold the digital signal held in the first latch circuit, according to the first transfer control signal, and
a fourth latch circuit configured to hold the digital signal held by the third latch circuit, according to a third transfer control signal.

11. An imaging system comprising:
the solid-state imaging apparatus according to claim 1; and
an optical unit configured to focus the first transfer control signal is outputted after the first conversion period and before the second conversion period.

* * * * *